United States Patent [19]

Ziche

[11] 4,296,235

[45] Oct. 20, 1981

[54] PROCESS FOR THE REMOVAL OF ALKALI METAL HALIDES FROM CELLULOSE ETHERS SOLUBLE IN COLD WATER AND USE OF THE PURIFIED PRODUCTS IN WASHING AND CLEANSING AGENT COMPOSITIONS

[75] Inventor: Horst Ziche, Dusseldorf, Fed. Rep. of Germany

[73] Assignee: Henkel Kommanditgesellschaft Auf Aktien, Dusseldorf-Holthausen, Fed. Rep. of Germany

[21] Appl. No.: 126,901

[22] Filed: Mar. 3, 1980

[30] Foreign Application Priority Data

Mar. 29, 1979 [DE] Fed. Rep. of Germany ....... 2912486

[51] Int. Cl.$^3$ ..................... C08B 11/20; C08B 11/22
[52] U.S. Cl. ............................ 536/85; 252/DIG. 15; 536/90; 536/91; 536/99; 536/100
[58] Field of Search ................ 252/DIG. 15; 536/85, 536/90, 91, 99, 100

[56] References Cited

U.S. PATENT DOCUMENTS

| | | | |
|---|---|---|---|
| 2,107,005 | 2/1938 | Le Fevre et al. | 536/85 |
| 3,453,261 | 7/1969 | Scherff | 536/85 |
| 4,100,094 | 7/1978 | Burns et al. | 536/88 |
| 4,131,558 | 12/1978 | Bailey et al. | 252/DIG. 15 |
| 4,136,038 | 1/1979 | Pracht et al. | 252/DIG. 15 |
| 4,138,352 | 2/1979 | Teot et al. | 252/DIG. 15 |
| 4,174,305 | 11/1979 | Burns et al. | 252/DIG. 15 |

FOREIGN PATENT DOCUMENTS

| | | | |
|---|---|---|---|
| 2249812 | 4/1973 | Fed. Rep. of Germany | 252/DIG. 15 |
| 427386 | 4/1935 | United Kingdom | 536/85 |
| 737263 | 9/1955 | United Kingdom | 536/85 |

Primary Examiner—Ronald W. Griffin
Attorney, Agent, or Firm—Hammond, Littell, Weissenberger and Muserlian

[57] ABSTRACT

A process for the purification of cold-water soluble cellulose ethers containing alkali metal halides consisting essentially of suspending a cold-water-soluble cellulose ether crude reaction product containing 25% by weight or more of alkali metal halides, based on the dry weight, in an aqueous solution containing from 4% to about 25% by weight of one or more water-soluble salts of acids selected from the group consisting of polybasic inorganic acids and organic polycarboxylic acids with agitation at a temperature of from 10° C. to 50° C., separating the purified cellulose ether solids and optionally repeating the suspending and separating steps one or more times. The resulting material can be employed in washing and cleansing composition slurries for spray-drying. The process is especially suitable for the treatment of methyl cellulose or water-soluble mixed ethers of methyl or ethyl cellulose with a sodium sulfate solution.

5 Claims, No Drawings

PROCESS FOR THE REMOVAL OF ALKALI METAL HALIDES FROM CELLULOSE ETHERS SOLUBLE IN COLD WATER AND USE OF THE PURIFIED PRODUCTS IN WASHING AND CLEANSING AGENT COMPOSITIONS

BACKGROUND OF THE INVENTION

This invention relates to a purifying process for technical grade cellulose ethers using aqueous salt solutions of polybasic inorganic acids and/or organic polycarboxylic acids.

Technical grade cold-water-soluble cellulose ethers, such as methyl cellulose, ethyl cellulose and mixed ethers of cellulose, such as methylhydroxypropyl cellulose, methylhydroxyethyl cellulose, methylhydroxybutyl cellulose, etc., contain considerable amounts of alkali metal halides, especially sodium chloride, due to their preparation by reaction of alkali metal cellulose with alkylating agents containing halides, such as methyl chloride, ethyl chloride, etc. The amount of alkali metal halides can amount to up to 50% by weight of the crude product, and is usually at least 25% by weight of the crude product. The content of alkali metal halides in the cellulose ether interferes with most intended purposes, and the crude cellulose ethers must be freed from alkali metal halides. The fact that the cellulose ethers are soluble in cold water but not in hot water is utilized in the conventional separation of the alkali metal halide impurities. The alkali metal salts, especially sodium chloride, are washed out with hot water. After separating the wash liquid, the products purified in this manner are dried and ground into powder or changed into a granulate.

This known purification process for cellulose ethers requires large amounts of energy and is expensive.

OBJECTS OF THE INVENTION

An object of the present invention is the development of a purification process that removes the alkali metal halides without the elaborate hot water wash and results in cellulose ethers that are substantially free from corrosive alkali metal halides.

Another object of the present invention is the development of a process for the preparation of purified cellulose ethers in such a form that they can be processed further immediately.

A further object of the present invention is the development of a process for the purification of cold-water-soluble cellulose ethers containing alkali metal halides consisting essentially of suspending a cold-water-soluble cellulose ether crude reaction product containing 25% by weight or more of alkali metal halides, based on the dry weight, in an aqueous solution containing from 4% to about 25% by weight of one or more water-soluble salts of acids selected from the group consisting of polybasic inorganic acids and organic polycarboxylic acids with agitation at a temperature of from 10° C. to 50° C., separating the purified cellulose ether solids and optionally repeating the suspending and separating steps one or more times.

These and other objects of the invention will become more apparent as the description thereof proceeds.

DESCRIPTION OF THE INVENTION

According to the invention, cellulose ethers that are soluble in cold water are purified in that the crude technical products are made into a slurry in an, at least 4%, aqueous solution of water-soluble salts of polybasic inorganic acids and/or organic polycarboxylic acids by agitating at a temperature of 10° to 50° C., preferably at 15° to 30° C., the aqueous solution is separated from the solids and the process is repeated, if necessary.

More particularly, the present invention relates to a process for the purification of cold-water soluble cellulose ethers containing alkali metal halides consisting essentially of suspending a cold-water-soluble cellulose ether crude reaction product containing 25% by weight or more of alkali metal halides, based on the dry weight, in an aqueous solution containing from 4% to about 25% by weight of one or more water-soluble salts of acids selected from the group consisting of polybasic inorganic acids and organic polycarboxylic acids with agitation at a temperature of from 10° C. to 50° C., separating the purified cellulose ether solids and optionally repeating the suspending and separating steps one or more times.

The moist filter cakes or the suspensions of the cellulose ethers, which still contain salts from the salt solution used for the purification, but different salts than the alkali metal halides originally present, can be used for all those purposes where the presence of these salts does not interfere or is desirable. A preferred use is in washing and cleansing agent compositions.

The purification process according to the invention can be used advantageously in the purification of methyl cellulose and/or ethyl cellulose or their mixed ethers that are soluble in cold water. The preparation of methyl cellulose or ethyl cellulose or their mixed ethers is well-known. See, for example, German Published Application DE-AS 14 68 048, which corresponds to U.S. Pat. No. 3,453,261, incorporated herein by reference. The crude products obtained by these known processes still contain considerable amounts of sodium chloride besides water. The sodium chloride content, based on dry methyl cellulose, is over 25% by weight and about 35% to 55% by weight. Similar conditions apply to nonionic mixed ethers prepared by analogous processes, and in which the cellulose contains hydroxyethyl or hydroxypropyl groups in addition to ethyl groups. A mixed etherification with small amounts of glycide, leading to the substitution with 2,3-dihydroxypropyl groups, is also practiced in the technology. All these cellulose ethers are cold-water-soluble.

The aqueous salt solutions, which are used for the treatment of the crude cellulose ethers, should be at least 4% by weight solutions. It goes without saying that the proportion of alkali metal salts, for example, potassium or sodium salts, or ammonium salts, may be correspondingly greater. Suitable concentrations are between about 5% and 25%, especially 6% to 15%, by weight.

The following water-soluble salts are suitable for the process according to the invention for the preparation of aqueous suspensions of the cellulose ethers: sodium sulfate, sodium carbonate, sodium hydrogen carbonate, sodium metasilicate, trisodium orthophosphate, potassium carbonate, dipotassium hydrogen phosphate, potassium dihydrogen phosphate; further, the alkali metal or ammonium salts of oxalic acid, tartaric acid, succinic acid, adipic acid and citric acid, as far as these salts are readily soluble in water. In special cases, sodium tetraborate, aluminum sulfate, magnesium sulfate or copper sulfate, for example, may also be used. Preferred, for practical reasons, are the sulfates, phosphates, silicates and/or carbonates of the alkali metal salts.

The temperatures of the suspension wash solutions should be between about 10° and 50° C. Generally, the work is carried out at temperatures between 15° and 30° C.

The treatment of the crude cellulose ethers with the salt solutions can be performed in the usual agitator vessels, which operate intermittently as well as continuously, with a continuous addition of salt solution and cellulose ether. The preferred apparatus to conduct the process is apparatus normally employed as a pulper in the recycling of waste paper. When separate batches are prepared, the cellulose ether is agitated in the salt solutions until the charged lumpy material breaks down to give a homogeneous suspension and, after breaking down, the washing solution is drained off. The washing process with the salt solutions can be repeated in these cases. Also possible is the introduction of various salts or mixed salts in the form of solutions of various concentrations.

According to an especially suitable form of preparation, a suspension of the purified cellulose ether in the soluble salt solution prepared in this manner is used directly for further processing, for example, in a slurry such as is needed for the manufacture of washing agent compositions and which is spray-dried to produce the powdered washing agent. The cellulose ethers, purified according to the invention, or the suspensions, can also be added to liquid washing and cleaning agents.

According to a preferred embodiment of this aspect of the invention, after suspending the cold-water-soluble cellulose ether one or more times in an aqueous salt solution containing from 4% to 15% by weight of alkali metal or ammonium salts of sulfuric, phosphoric, silicic and/or carbonic acid, and then draining the solution from the solids, the moist cold-water-soluble cellulose ether, substantially freed of alkali metal halides, is suspended in the above aqueous salt solution to give a suspension having a total solids content of from 8% to 20% by weight. This suspension is incorporated into a conventional aqueous detergent slurry for spray-drying to give a powdered washing agent containing the cold-water-soluble cellulose ether.

The invention, therefore, also involves the improvement in the process of preparing a powdered washing agent comprising surface-active agents, builders, soil suspension agents, and cold-water-soluble cellulose ethers, comprising the steps of preparing an aqueous slurry of the ingredients, spray-drying the slurry at temperatures below 100° C. and recovering a powdered washing agent, the improvement consisting of using an aqueous suspension of a cold-water-soluble cellulose ether substantially freed of alkali metal halides in an aqueous salt solution containing from 4% to 15% by weight of alkali metal or ammonium sulfates, phosphates, silicates and/or carbonates, said suspension having a total solids content of from 8% to 20% by weight, as said cold-water-soluble cellulose ether.

The following examples are illustrative of the invention without being limitative in any respect.

EXAMPLE 1

7,000 liters of a 4% by weight sodium sulfate solution at a temperature of 22° C. were placed in a washing vessel with a capacity of 12 m$^3$. Also added was one metric ton of moist, crude methylhydroxypropyl cellulose chips that contained sodium chloride (bone dry, 350 kg; see U.S. Pat. No. 3,453,261, Example 2, before washing). The crude methylhydroxypropyl cellulose had a DP of 120, which corresponds to a 2% Brookfield viscosity of 50 mPa.s. The vessel was agitated with an agitator (2,000 rpm), the shaft of which had 5 propeller-like wings attached to it at equal distances. All chips were changed into a fibrous suspension after 15 minutes.

Subsequently, the salt solution was drained through a sieve in the bottom of the washing vessel. A moist methylhydroxypropyl cellulose remained, which was then washed twice, each time with 7,000 liters of 6% sodium sulfate solution. Then, 6% sodium sulfate solution was added until the total solids content was 12%. The suspension, which was subsequently pumped into a storage tank, had a viscosity of 5,000 mPa.s according to Brookfield. This suspension had a chloride content of less than 0.04% by weight.

Fifty kilograms of the suspension prepared in this manner were added to 1000 kilograms of a slurry for a detergent to be spray-dried at 60° C. The detergent slurry had the following composition:

60 kg anionic tenside
24 kg nonionic tenside
12 kg soap
180 kg sodium tripolyphosphate
180 kg zeolite A (crystalline)
18 kg water glass (Na$_2$O:SiO$_2$=3.3:1)
120 kg sodium sulfate
6 kg carboxymethyl cellulose
400 kg water.

The slurry was spray-dried at 60° C. in the customary fashion.

EXAMPLE 2

7,000 liters of a 5% by weight sodium sulfate solution were placed into a pulper (pulp dissolver) generally used in the paper industry, with a capacity of 12 m$^3$. The motor output of the pulper was 100 kW, the dissolver wheel turned at 425 rpm. 2.2 metric tons of crude methyl cellulose from an autoclave, which contained sodium chloride and was in the form of moist chips, were added and neutralized. The methyl cellulose had a DP of 80, corresponding to a Brookfield viscosity of 25 mPa.s.

After an agitation time of 10 minutes, a homogeneous fiber suspension had formed, and the salt solution was drained through a plate with holes, in the bottom of the pulper. Then, the described washing process was repeated two more times, each with 7,000 liters of 6% by weight sodium sulfate solution. Subsequently, the solids content of the suspension was made up to 13% by weight by the addition of the methyl cellulose to a 6% by weight sodium sulfate solution, and pumped into a storage tank. The viscosity was then 5,800 mPa.s. This suspension had a chloride content of less than 0.05% by weight.

Fifty kilograms of the methyl cellulose suspension prepared in this manner were added to 1,000 kilograms of a detergent slurry to be spray-dried at 90° C. The slurry composition was:

47 kg. anionic tenside
30 kg nonionic tenside
20 kg soap
155 kg sodium tripolyphosphate
155 kg zeolite A (crystalline)
30 kg water glass (Na$_2$O:SiO$_2$=3.3:1)
155 kg sodium sulfate
8 kg carboxymethyl cellulose 400 kg water.

The slurry was spray-dried in the spray-drying tower, in the conventional manner. The powdered detergent obtained could be utilized for convention textile machine washing.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A process for the purification of cold-water soluble cellulose ethers containing alkali metal halides consisting essentially of suspending a cold-water-soluble cellulose ether crude reaction product containing 25% by weight or more of alkali metal halides, based on the dry weight, where said cellulose ethers are selected from the group consisting of methyl cellulose, ethyl cellulose, mixed methyl/ethyl cellulose, mixed ethyl/hydroxyethyl cellulose, mixed ethyl/hydroxypropyl cellulose and mixed ethyl/dihydroxypropyl cellulose, in an aqueous solution containing from 4% to about 25% by weight of one or more water-soluble salts selected from the group consisting of alkali metal sulfates, alkali metal phosphates, alkali metal silicates and alkali metal carbonates, with agitation at a temperature of from 10° C. to 50° C., separating the purified cellulose ether solids and repeating the suspending and separating steps zero, one or more times.

2. The process of claim 1 wherein said temperature is from 15° C. to 30° C.

3. The process of claim 1 wherein said water-soluble salts are the alkali metal and ammonium salts.

4. The process of claim 1 wherein said aqueous solution contains from 5% to 25% by weight of said salts.

5. The process of claim 1 wherein said aqueous solution contains from 6% to 15% by weight of said salts.

* * * * *